United States Patent [19]
Baran

[11] Patent Number: 6,153,307
[45] Date of Patent: Nov. 28, 2000

[54] COMPATIBILIZER AND LAMINATES CONTAINING SAID COMPATIBILIZER

[75] Inventor: Beth Ann Baran, Monessen, Pa.

[73] Assignee: Nova Chemicals Inc., Monaca, Pa.

[21] Appl. No.: 09/126,490

[22] Filed: Jul. 30, 1998

[51] Int. Cl.[7] .......................... B32B 27/08; B32B 27/30; B32B 27/32; B32B 27/36

[52] U.S. Cl. ........................ 428/483; 428/480; 428/515; 428/516; 428/517; 428/519; 428/521; 525/63; 525/64; 525/69; 525/70; 525/78; 525/80; 525/83; 525/84; 525/86; 525/88; 525/92 R; 525/92 F; 525/89; 525/95; 525/98

[58] Field of Search ...................................... 428/480, 483, 428/515, 516, 517, 519, 521; 525/63, 64, 69, 70, 78, 79, 80, 81, 82, 83, 84, 85, 86, 88, 92 R, 92 F, 89, 95, 98

[56] References Cited

U.S. PATENT DOCUMENTS

| 4,978,715 | 12/1990 | Brown et al. | 525/92 |
| 5,081,184 | 1/1992 | Brown et al. | 525/67 |

FOREIGN PATENT DOCUMENTS

09029915 A2  4/1997  Japan .

OTHER PUBLICATIONS

G. Holden, Current Applications of Styrenic Block Copolymer Rubbers, Journal of Elastomers and Plastics, vol. 14, Jul. 1982 pp. 148–154.

D. Kim, J. Park, J. Kim, J. Ahn, H. Kim & S. Lee, Compatibility Enhancement and toughening of Poly(butylene terephthalate)/poly (phenylene oxide) blends using a reactive compatibilizer, Dept. Polymer Sci. & Eng. SungKyunKwan Univ., Kyunggi, 440–746, S. Korea 1996. Pollimo (1996), 20(4), 611–621.

J. Kim, H. Lee, The effect of PS–GMA as an in situ compatibilizer on the morphology and rheological properties of the immiscible PBT/PS blend, Dep. Chem. Eng., Pohang Univ. Science & Technology, Kyungbuk, 790–84, S. Korea, Polymer (1996) 37(2), 305–11.

*Primary Examiner*—Vivian Chen
*Attorney, Agent, or Firm*—Kenneth H. Johnson

[57] ABSTRACT

The present invention relates to compatibilizers useful to laminate a layer of a vinyl aromatic polymer such as polystyrene and a polyester such as PET. The compatibilizer comprises a mixture comprising 5–95 weight % of a polyester, 95-5 weight % of an impact modified polymer of a vinyl aromatic monomer such as high impact polystyrene (HIPS) and from 5 to 20 weight % of a hydrogenated block polymer of a vinyl aromatic monomer and a conjugated diolefin sometimes called SEBS.

47 Claims, No Drawings

COMPATIBILIZER AND LAMINATES CONTAINING SAID COMPATIBILIZER

FIELD OF THE INVENTION

The present invention relates to a compatibilizer blend which is useful to laminate impact modified styrenic polymers to polyesters, more particularly to laminate high impact polystyrene (HIPS) to polybutylene terephthalate (PBT) or polyethylene terephthalate (PET). HIPS and PBT or Pet are incompatible. Until the present invention it has been common practice to laminate a layer of HIPS to one or more layers of either PBT or PET using an adhesive. In addition to the compatibilizer the present invention provides a laminate of polystyrene and a polyester and a thermoformed product from such a laminate. Such products are particularly useful in food packaging applications having the rigidity of the styrenic polymer and the oxygen barrier properties of the polyester.

BACKGROUND OF THE INVENTION

The paper "Current Applications of Styrenic Block Copolymers of Rubbers" by G. Holden, Journal of Elastomers and Plastics, Vol. 14, (July 1982) p. 148, teaches that styrene butadiene styrene (SBS) block polymers are compatible with polystyrene and hydrogenated styrene butadiene styrene or styrene ethylene butadiene styrene (SEBS) polymers are compatible with a wide range of engineering resins including nylon, polybutylene terephthalate (PBT), polyacetal and polycarbonate. The reference does not teach that a blend of SEBS, a polyalkylene terephthalate and a vinyl aromatic polymer is or would be useful to compatibilize laminates of high impact polystyrene (HIPS) and aromatic polyesters such as PBT or polyethylene terephthalate (PET).

There are abstracts of a number of patents which suggest laminates may be made of PBT or PET and polystyrene using as an intermediate layer a functionalized SEBS. Representative of this art is Chemical abstract 1997:243702 of Japanese Kokai 09029915 which teaches a three layered laminate comprising a layer of a poly(alkylene terephthalate), a layer of an epoxidized vinyl aromatic conjugated diene compound block copolymer and polystyrene compound. Specifically, a laminate of PET, an SB block copolymer treated with AcOOH and high impact polystyrene is used in the packaging of electronic parts. The reference does not teach the use of SEBS nor does the reference teach a compatibilizer which is a blend of SEBS, a polyalkylene terephthalate and a styrenic polymer as a compatibilizer for a laminate of a polyalkylene terephthalate and high impact polystyrene. Further the compatibilizers of the present invention are not functionalized in the sense taught by the reference.

Similarly Chemical Abstract 1996:114283 of the effect of PS-GMA as an in situ compatibilizer on the morphology and rheological properties of the immiscible PBT.PS blend, Kim, Jin Kon; Lee, Hawyong (Dep. Chemical Engineering, Pohang Univ. Science and Technol., Kyungbuk, 790–84(S. Korea) Polymer, 37(2), 305–11,1996 teaches that a functionalized polystyrene, namely polystyrene functionalized with glycidyl methacrylates is useful as an in situ compatibilizer for blends of PBT and PS. The glycidyl methacrylate reacts with the carboxylic acid group from the PBT. The reference does not teach a three-component compatibilizer of HIPS, polyalkylene terephthalate, and SEBS.

Chemical Abstract 1996:503062, compatibility enhancement and toughening of poly(butylene terephthalate(/poly (phenyleneoxide) blends using a reactive compatibilizer, Kim, Dongsup; Park, Jae-Hyung; Kim Jinhwan; Ahn, Jungho; Kim, Hyungsu; Lee, Sai-Soo (Dept. Polymer Sci.&Eng.), SungKyunKwan Univ. Kyunggi, 440–746, (S. Korea) Pollimo, 20(4), 611–621 (Korean) 1996, teaches blends of PBT/PPO, a reactive compatibilizer and SEBS. The reactive functionalilzer either had an end group such as glycidyl methacrylate which could react with the polyester (PBR) or was miscible in the PPO such as polystyrene. The reference teaches away from the present invention as it requires the presence of PPO or a functionality which reacts with the polyester, such as glycidyl methacrylate, neither of which are in the compatibilizer blends of the present invention.

Applicants have not been able to find a reference which teaches a blend of a polyalkylene terephthalate, HIPS and SEBS, optionally with additional (crystal) polystyrene as a blend per se or as a compatibilizer for a laminate of polyalkylene terephthalate and HIPS.

SUMMARY OF THE INVENTION

The present invention provides a compatibilizer comprising:

i) from 5 to 95 weight % of one or more polyester comprising from 50 to 80 weight % of one or more $C_{8-14}$ aromatic dicarboxylic acids; from 20 to 50 weight % of one or more glycols selected from the group consisting of $C_{2-10}$ alkylene glycols and $C_{6-10}$ cyclic glycols and optionally from 0 to 10 weight % of one or more $C_{3-12}$ saturated aliphatic dicarboxylic acids;

ii) from 95 to 5 weight % of an impact modified polymer comprising a continuous phase comprising a) from 50 to 100 weight % of one or more $C_{8-12}$ vinyl aromatic monomers which are unsubstituted or substituted by a $C_{1-4}$ alkyl radical; and b) from 0 to 50 weight % of one or more monomers selected from the group consisting of acrylonitrile, methacrylonitrile, and $C_{1-4}$ alkyl esters of $C_{3-4}$ ethylenically unsaturated carboxylic acids;

which polymer has been grafted onto from 3 to 15 weight % based on the weight of the continuous phase of a rubbery polymer selected from the group consisting of:

c) i) polymers comprising one or more $C_{4-6}$ conjugated diolefin monomers;

ii) polymers comprising from 20 to 40 weight % of one or more monomers selected from the group consisting of acrylonitrile and methacrylonitrile and from 80 to 60 weight % of one or more $C_{4-6}$ conjugated diolefin monomers; and iii) polymers comprising from 40 to 60 weight % of one or more $C_{6-12}$ vinyl aromatic monomers which are unsubstituted or substituted by a $C_{1-4}$ alkyl radical and from 60 to 40 weight % of one or more $C_{4-6}$ conjugated diolefin monomers;

iii) from 5 to 20 weight % of a block copolymer comprising from 20 to 50 weight % of one or more blocks of a polymer of one or more $C_{8-12}$ vinyl aromatic monomer which is unsubstituted or substituted by a $C_{1-4}$ alkyl radical and from 80 to 50 weight % of one or more blocks of a polymer of a $C_{4-6}$ conjugated diolefin monomer which block polymer has been hydrogenated to at least 80%; and iv) optionally, from 0 to 50 weight % of a polymer comprising one or more $C_{8-12}$ vinyl aromatic monomers which are unsubstituted or substituted by a $C_{1-4}$ alkyl radical, the sum of the weight % of the components in the composition being 100 weight %.

The present invention further provides a laminate comprising at least one layer of an impact modified polymer as described above, having a thickness from 3 to 45 mils, at least one layer of a polyalkylene terephthalate ester having a thickness from 1 to 45 mils and an intermediate layer of the above compatibilizer.

The present invention provides a two-layer laminate, each layer being from 1 to 45 mils thick, comprising a layer of up to 95 weight % of polyester and at least 5 weight % of the above compatibilizer and a layer comprising up to 95 weight % of an impact modified polymer as described above and at least 5 weight % of the above compatibilizer.

The present invention further provides a thermoformed article made from the above laminates.

DETAILED DESCRITPION

The present invention relates to a compatibilizer blend comprising a polyalkylene terephthalate, an impact modified vinyl aromatic polymer, and a hydrogenated block polymer of a vinyl aromatic monomer and a conjugated diolefin.

In accordance with the present invention the polyester may be present in the compatibilizer blend in an amount from 5 to 95 weight %, preferably from 75 to 25 weight %, the impact modified vinyl aromatic polymer may be present in an amount from 95 to 5, preferably from 75 to 25 weight %, and the hydrogenated block polymer of a vinyl aromatic monomer and a conjugated diolefin may be present in an amount from 5 to 20, preferably from 8 to 15 weight % and optionally from 0 to 50, preferably from 5 to 30 weight % of a polymer of one or more vinyl aromatic monomers, the total composition being 100 weight %.

In one embodiment of the present invention the compatibilizer may comprise from 30 to 55 weight % of polyester, from 55 to 30 weight % of impact modified polymer, from 5 to 15 weight % of block copolymer and from 0 to 35 weight % of a polymer of one or more vinyl aromatic monomers.

The polyester may comprise from 50 to 80 weight % of one or more $C_{8-14}$ aromatic dicarboxylic acids; from 20 to 50 weight % of one or more $C_{2-10}$ alkylene glycols and/or $C_{6-10}$ cyclic glycols (e.g. cyclohexanediol or cyclohexanedimethanol) and optionally from 0 to 10 weight % of one or more $C_{3-12}$ saturated aliphatic dicarboxylic acids.

Some $C_{8-14}$ aromatic dicarboxylic acids include terephthalic acid and isophthalic acid. Lower ($C_{1-4}$) alkyl esters of such acids include dimethyl terephthalic acid (DMT). Terephthalic acid and DMT are particularly useful monomers in preparing the polyester. Some $C_{2-10}$ alkylene glycols include ethylene glycol, propylene glycol, and their higher homologues such as 1,10-decamethylene glycol. Particularly useful glycols are ethylene glycol and butylene glycol. These glycols are used to prepare polyethylene terephthalate (PET) and polybutylene terephthalate (PBT). The polyester may be based upon polyethylene terephthalate or polybutylene terephthalate and contain a $C_{6-10}$ cyclic glycol, as in PETG.

If desired, the polyester may contain up to 10, preferably less than 5, weight % of one or more aliphatic dicarboxylic acids. Some aliphatic dicarboxylic acids include adipic acid; sebacic acid; azelaic acid; and dodecandioic acid.

The impact modified polymer of one or more vinyl aromatic monomers comprising a continuous phase comprising:

a) from 50 to 100, weight % of one or more $C_{8-12}$ vinyl aromatic monomers which are unsubstituted or substituted by a $C_{1-4}$ alkyl radical; and b) from 0 to 50 weight % of one or more monomers selected from the group consisting of acrylonitrile, methacrylonitrile, and $C_{1-4}$ alkyl esters of $C_{3-4}$ ethylenically unsaturated carboxylic acids, which polymer has been grafted onto from 3 to 15 weight % based on the weight of the continuous phase of a rubbery polymer selected from the group consisting of:

c) i) polymers comprising one or more $C_{4-6}$ conjugated diolefin monomers;

ii) polymers comprising from 20 to 40 weight % of one or more monomers selected from the group consisting of acrylonitrile and methacrylonitrile and from 80 to 60 weight % of one or more $C_{4-6}$ conjugated diolefin monomers; and iii) polymers comprising from 40 to 60 weight % of one or more $C_{6-12}$ vinyl aromatic monomers which are unsubstituted or substituted by a $C_{1-4}$ alkyl radical and from 60 to 40 weight % of one or more $C_{4-6}$ conjugated diolefin monomers.

The $C_{8-12}$ vinyl aromatic monomer in the above compositions may be selected for the group consisting of styrene, alpha methyl styrene, p-methyl styrene and p-t-butyl styrene. Accordingly, if the continuous phase is a homopolymer of the vinyl aromatic monomer it may be polystyrene. However, the continuous phase may be a copolymer in which the comonomer (in addition to the vinyl aromatic monomer) comprises one or more monomers selected from the group consisting of acrylonitrile, methacrylonitrile and $C_{1-4}$ alkyl esters of $C_{3-4}$ ethylenically unsaturated carboxylic acids, preferably monocarboxylic acid. Some useful esters include methyl acrylate, ethyl acrylate, butyl acrylate, methyl methacrylate, ethyl methacrylate and butyl methacrylate. If the continuous phase is a copolymer of a vinyl aromatic monomer and acrylonitrile or methacrylonitrile it may comprise from 50 to about 95 weight % of one or more vinyl aromatic monomers and from 5 to 50 weight % of acrylonitrile and/or methacrylonitrile. If the continuous phase is a copolymer of one or more vinyl aromatic monomers and a $C_{1-4}$ alkyl ester of a $C_{3-4}$ ethylenically unsaturated carboxylic acid it may comprise from 50 to 95 weight % of vinyl aromatic monomer and from 5 to 50 weight % of $C_{1-4}$ alkyl ester of $C_{3-4}$ ethylenically unsaturated ester. Particularly useful continuous phase polymers may be styrene-acrylonitrile polymers (SAN) and copolymers of styrene and methyl methacrylates (sold by NOVA Chemicals Inc. under the trademark NAS®).

The continuous phase is grafted onto a rubbery impact modifier. The rubbery polymer may be present in the impact modified vinyl aromatic polymer in an amount from 3 to 15, preferably from 3 to 10 weight % based on the weight of the continuous phase. The rubbers which may be used to form the final dispersed rubber phase of the present invention will typically have a weight average molecular weight (Mw) of greater than about 150,000, preferably greater than 200,000.

The rubbery polymer may be selected from the group consisting of:

i) polymers comprising one or more $C_{4-6}$ conjugated diolefin monomers;

ii) polymers comprising from 20 to 40 weight % of one or more monomers selected from the group consisting of acrylonitrile and methacrylonitrile and from 80 to 60 weight % of one or more $C_{4-6}$ conjugated diolefin monomers; and iii) polymers comprising from 40 to 60 weight % of one or more $C_{6-12}$ vinyl aromatic monomers which are unsubstituted or substituted by a $C_{1-4}$ alkyl radical and from 60 to 40 weight % of one or more $C_{4-6}$ conjugated diolefin monomers.

The group of rubbery polymers comprising one or more $C_{4-6}$ conjugated diolefins are typically the polybutadiene rubbers (i.e. the preferred conjugated diolefin is butadiene although isoprene is also useful). The polybutadiene rubbers generally have a stereo configuration. That is the pendant methyl groups on the polymer backbone may be on opposite sides of the backbone (e.g. the trans configuration) or may be on the same side of the backbone (i.e. the cis configuration). The polybutadiene may have a high cis configuration typically over 90%, preferably over 95%, most preferably over 98% of the monomer units in the cis configuration. Such polymers are commercially available, for example, from Bayer Rubber Company under the trademark TAKTENE® (e.g. TAKETNE® 1202). The polybutadiene may contain less than 60% weight %, typically from 30 to 50 weight %, most preferably about 35 to 45 weight % of monomer in the cis configuration. Such rubbers are commercially available from Firestone under the trademark DIENE® 55 or from Bayer under the trademark TAKTENE® 550. DIENE® 55 and TAKTENE® 550 are known as medium cis, medium viscosity polybutadienes. Other grades of polybutadienes are commercially available. DIENE® 35 and TAKTENE® 380 are known as medium cis, low viscosity polybutadienes. DIENE® 70 and TAKTENE® 710 are known as medium cis, high viscosity polybutadienes.

The rubbery polymer may comprise from 20 to 40 weight % of acrylonitrile or methacrylonitrile, preferably acrylonitrile, and from 80 to 60, weight % of one or more $C_{4-6}$ conjugated diolefins, preferably butadiene. Such polymers are the commercially available nitrile rubbers available from Bayer Rubber Company under the trademark KRYNAC® and from Bayer AG under the trademark PERBUNAN®.

Suitable rubbery polymers may comprise from 40 to 60 weight % of one or more $C_{8-12}$ vinyl aromatic monomers which are unsubstituted or substituted by a $C_{1-4}$ alkyl radical, and from 60 to 40 weight % of one or more $C_{4-6}$ conjugated diolefins. Such rubber polymers may be random copolymers which are the commercially available styrene butadiene rubbers (SBR). Suitable vinyl aromatic monomers and conjugated diolefin monomers for use in such rubbers have been described above.

The impact modified vinyl aromatic polymers may be prepared using conventional well known methods. Typically in a bulk or solution process the rubbery polymer is dissolved in the vinyl aromatic monomer (forming an infinitely swollen rubber phase—e.g. the rubber phase is continuous and the vinyl aromatic monomer and solvent is discontinuous) and the resulting solution is subjected to polymerization and shear to cause phase separation/inversion typically when the degree of conversion of vinyl aromatic monomer (and comonomer) reaches about the mass of the rubber phase). The monomer is then polymerized to above about 80% conversion (either in towers or horizontal reactors) and then devolatilized and extruded and chopped into pellets. In some processes partially polymerized syrups may be, for example, subjected to recycle to alter the degree of conversion in a zone within a reactor to cause phase inversion or an unpolymerized solution may be fed directly into a solution polymerized above the inversion point to cause inversion. These methods to alter the inversion point and cause the rubber phase to separate may on occasion be referred to as a dispersion process. In some cases to control particle size of the rubber phase the rubber may be prepared by an emulsion polymerization process to produce a smaller rubber particle size which is added directly to the polymerizing monomers.

A particularly useful impact modified vinyl aromatic polymer is high impact polystyrene (HIPS) although acrylonitrile butadiene styrene (ABS) polymers may also be useful.

The third component in the compatibilizers of the present invention is a block copolymer comprising from 20 to 50, preferably from 25 to 35 weight % of one or more blocks of a $C_{8-12}$ vinyl aromatic monomer which is unsubstituted or substituted by a $C_{1-4}$ alkyl radical and from 80 to 50, preferably from 75 to 65 weight % of one or more blocks of a $C_{4-6}$ conjugated diolefin monomer which block polymer has been hydrogenated to at least 85%, preferably greater than 90%, most preferably greater than 95%. The degree of hydrogenation refers to the hydrogenation of residual unsaturated bonds in the block polymer. A degree of hydrogenation of 85% means that 85% of the residual unsaturated bonds in the polymer have been hydrogenated to saturated bonds. Suitable vinyl aromatic monomers and suitable conjugated diolefin monomers have been disclosed above. Such polymers are commercially available for example from Shell under the trademark KRATON®.

The fourth component in the compatibilizers of the present invention is an optional component. That is it may be present in the composition in amount from 0 up to 50, preferably if it is present it is present in an amount from 5 to 30 weight % based on the weight of the composition. The component is a polymer of a $C_{8-12}$ vinyl aromatic monomer which is unsubstituted or substituted by a $C_{1-4}$ alkyl radical. Such monomers have been disclosed above. A particularly useful polymer is polystyrene.

The compatibilizer may be prepared by dry blending the ingredients in the ratios indicated above and feeding the resulting blend to an extruder. In the alternative one or more blends of the dry components could be fed to an extruder in ratios to provide a final composition in accordance with the above compositions. Typically the extruder will operate at a barrel temperature in the range from 175° C. to 275° C., preferably from 200° C. to 250° C. Generally in commercial operation the extruder will have a number of zones in the barrel which will be within the above ranges. The extruder will have a screw to provide good mixing and also to extrude the melt blend. The resulting blend may be cut into pellets or extruded directly into a laminate.

The compatibilizer of the present invention is useful in the preparation of multilayer laminates of impact modified vinyl aromatic polymers having the composition described above (such as HIPS) and aromatic polyesters as described above (such as PBT) which are normally incompatible materials. Generally the impact modified polymer provides the required support properties such as stiffness and impact resistance required of the container and the polyester provides appropriate barrier (e.g. oxygen barrier) for the package. The polyester layer may be from 1 to 45 mils (thousands of an inch=0.00254 cm to 0.1143 cm (about 1 mm)), preferably from 1 to 15 mils (0.00254 cm to 0.0381 cm). The impact modified vinyl aromatic polymer layer may be from 3 to 45 mils (0.00762 cm to 0.1143 cm) thick. The compatibilizer layer is extruded intermediate the polyester layer and the layer of the impact modified vinyl aromatic polymer. The compatibilizer layer may have a thickness from 1 to 10 mils (0.00254 to 0.0254 cm). The laminate may be made using conventional multi layer extrusion equipment to produce at least a three layer extrusion (e.g. PBT, compatibilizer and HIPS).

In a further embodiment of the present invention the laminate may be a two layer laminate in which one layer comprises up to 95 weight % polyester and not less than 5 weight % of compatibilizer and the other layer comprises up to 95 weight % of impact modified polymer and at least 5 weight % of compatibilizer. Preferably the compatibilizer is used in each of the layers in an amount of not less than 10 weight %, typically in an amount from 10 to 25 weight %. Each layer in the laminate may range from 1 to 45 mils thick.

The resulting laminate is surprisingly robust and may be thermoformed without delamination using conventional times and temperatures for the thermoforming of sheet polystyrene. The laminate may be deep drawn to form cups or the like. The thermoformed laminates are particularly useful in packaging foods such as dairy products (e.g. yogurt).

The present invention will now be illustrated by the following non-limiting examples in which, unless other wise indicated, parts means parts by weight (e.g. grams) and % means weight % (based on the final weight of the composition).

In the following examples, unless otherwise indicated, the polyester was a PBT commercially available under the trade name VALOX; the high impact polystyrene was commercially available under the trade name NOVA Chemicals Polystyrene 4300E; the block copolymer was a copolymer comprising about 30 weight % polystyrene and about 70 weight % polybutadiene and hydrogenated to at least 80%, sold under the trademark KRATON.

COMPATIBILIZER

EXAMPLE 1

A blend of 5% PBT, 10% SEBS, and 85% HIPS was compounded in a Leistritz 34 mm counter-rotating twin screw extruder with a four strand 3 mm die. The barrel temperature ranged from 200–232° C. A vacuum of 29 inches was pulled on the barrel. Melt temperature was measured at 465° F. (240° C.) The resulting product was well mixed and extruded as strands and pelletized.

EXAMPLE 2

A blend of 30% PBT, 10% SEBS, and 60% HIPS was compounded in a Leistritz 34 mm counter-rotating twin screw extruder with a four strand 3 mm die. The barrel temperature ranged from 200–232° C. A vacuum of 29 inches was pulled on the barrel. The resulting product was well mixed and extruded as strands and pelletized

EXAMPLE 3

A blend of 80% PBT, 10% SEBS, and 10% HIPS was compounded in a Leistritz 34 mm counter-rotating twin screw extruder with a four strand 3 mm die. The barrel temperature ranged from 220–248° C. A vacuum of 29 inches was pulled on the barrel. The sample was later extruded and thermoformed.

EXAMPLE 4

A blend of 45% PBT, 10% SEBS, and 45% HIPS was compounded in a Leistritz 34 mm counter-rotating twin screw extruder with a four strand 3 mm die. The barrel temperature ranged from 220–248° C. A vacuum of 29 inches was pulled on the barrel. The sample was later extruded with a dry blend including GPPS (general purpose polystyrene NOVA Chemicals Polystyrene 103—crystal) and thermoformed. The thermoformed product comprised a top layer of PBT, a middle layer of the compatibilizer and a bottom layer of HIPS. The resulting thermoformed product had excellent adhesion and there was no delamination during or after thermoforming.

EXAMPLE 5

A blend of 34.25% PBT, 6.5% SEBS, 34.25% HIPS, and 25% GPPS was compounded in a Leistritz 34 mm counter-rotating twin screw extruder with a four strand 3 mm die. The barrel temperature ranged from 220–250° C. A vacuum of 28 inches was pulled on the barrel. The compatibilizer was extruded as the middle layer of a three layer laminate of PBE, compatibilizer and HIPS. The laminate thermoformed well.

LAMINATES

Two Layer Laminate:

Using two extruders an AB laminate structure was prepared. The A layer consisted of 90% PBT with 10% compatibilizer (Example 3). The B layer consisted of 90% HIPS with 10% compatibilizer (Example3). The die was set at 25 mils. Barrel temperatures for the A layer ranged from 450–500° F. (about 235–260° C.). Barrel temperatures for the B layer ranged from 420–480° F. (about 220–250° C.). Top roll temperature was 165° F. (about 75° C.), middle roll temperature was 185° F. (about 85° C.), and bottom roll temperature was 145° F. (about 63° C.). This sample was thermoformed. The laminate thermoformed adequately.

Three Layer Laminate:

Using the three extruders, an ABC structure was prepared. The A layer consisted of 100% PBT. The B layer consisted of 80% compatibilizer (Example 3) and 20% GPPS dry blended together and extruded. The C layer consisted of 100% HIPS. Barrel temperatures for the A layer ranged from 450–500° F. (about 235–260° C.). Barrel temperatures in both the B and C layers ranged from 420–480° F. (about 220–250° C.). Top roll temperature was 132° F. (about 56° C.), middle roll temperature was 150° F. (about 66° C.), and bottom roll temperature was 146° F. (about 63° C.). This sample was thermoformed and performed excellently with no delamination.

What is claimed is:

1. A compatibilizer comprising:
   i) from 5 to 95 weight % of one or more polyesters comprising from 50 to 80 weight % of one or more $C_{8-14}$ aromatic dicarboxylic acids; from 20 to 50 weight % of one or more glycols selected from the group consisting of $C_{2-10}$ alkylene glycols and $C_{6-10}$ cyclic glycols and optionally from 0 to 10 weight % of one or more $C_{3-12}$ saturated aliphatic dicarboxylic acids;
   ii) from 95 to 5 weight % of an impact modified polymer comprising a continuous phase comprising:
      a) from 50 to 100 weight % of one or more $C_{8-12}$ vinyl aromatic monomers which are unsubstituted or substituted by a $C_{1-4}$ alkyl radical; and
      b) from 0 to 50 weight % of one or more monomers selected from the group consisting of acrylonitrile, methacrylonitrile, and $C_{1-4}$ alkyl esters of $C_{3-4}$ ethylenically unsaturated carboxylic acids;
   which polymer has been grafted onto from 3 to 15 weight % based on the weight of the continuous phase of a rubbery polymer selected from the group consisting of:

c) i) polymers comprising one or more $C_{4-6}$ conjugated diolefin monomers;
   ii) polymers comprising from 20 to 40 weight % of one or more monomers selected from the group consisting of acrylonitrile and methacrylonitrile and from 80 to 60 weight % of one or more $C_{4-6}$ conjugated diolefin monomers; and
   iii) polymers comprising from 40 to 60 weight % of one or more $C_{6-12}$ vinyl aromatic monomers which are unsubstituted or substituted by a $C_{1-4}$ alkyl radical and from 60 to 40 weight % of one or more $C_{4-6}$ conjugated diolefin monomers;
iii) from 5 to 20 weight % of a block copolymer comprising from 20 to 50 weight % of one or more blocks of a polymer of one or more $C_{8-12}$ vinyl aromatic monomer which is unsubstituted or substituted by a $C_{1-4}$ alkyl radical and from 80 to 50 weight % of one or more blocks of a polymer of a $C_{4-6}$ conjugated diolefin monomer which block polymer has been hydrogenated to at least 80%; and
iv) optionally from 0 to 50 weight % of a polymer comprising one or more $C_{8-12}$ vinyl aromatic monomers which are unsubstituted or substituted by a $C_{1-4}$ alkyl radical, the sum of the weight % of the components in the compatibilizer being 100 weight %.

2. The compatibilizer according to claim 1, wherein said $C_{8-12}$ vinyl aromatic monomer is selected from the group consisting of styrene, alpha methyl styrene, p-methyl styrene and p-t-butyl styrene.

3. The compatibilizer according to claim 2, wherein said $C_{4-6}$ conjugated diolefin is selected from the group consisting of butadiene and isoprene.

4. The compatibilizer according to claim 3, wherein in component ii) said rubbery polymer is polybutadiene.

5. The compatibilizer according to claim 4, wherein in component ii) said rubbery polymer is present in an amount from 3 to 10 weight % based on the weight of the continuous phase.

6. The compatibilizer according to claim 5, wherein said block polymer comprises from 25 to 35 weight % of polystyrene and from 75 to 85 weight % of polybutadiene and has been hydrogenated to at least 90%.

7. The compatibilizer according to claim 6, wherein component ii) is present in an amount from 25 to 75 weight % based on the total weight of the compatibilizer.

8. The compatibilizer according to claim 7, wherein the polyester is present in an amount from 75 to 25 weight % based on the total weight of the compatibilizer.

9. The compatibilizer according to claim 8, wherein the block copolymer is present in amount from 8 to 15 weight % based on the weight of the compatibilizer.

10. The compatibilizer according to claim 9, wherein component i) is polybutylene terephthalate.

11. The compatibilizer according to claim 10, wherein component iv) is present in an amount from 5 to 30 weight % based on the weight of the compatibilizer.

12. The compatibilizer according to claim 9, wherein component i) is polyethylene terephthalate.

13. The compatibilizer according to claim 12, wherein component iv) is present in an amount from 5 to 30 weight % based on the weight of the compatibilizer.

14. A laminate comprising:
A) at least one layer having a thickness from 3–45 mils of an impact modified polymer comprising a continuous phase comprising:
   a) from 50 to 100 weight % of one or more $C_{8-12}$ vinyl aromatic monomers which are unsubstituted or substituted by a $C_{1-4}$ alkyl radical; and
   b) from 0 to 50 weight % of one or more monomers selected from the group consisting of acrylonitrile, methacrylonitrile, and $C_{1-4}$ alkyl esters of $C_{3-4}$ ethylenically unsaturated carboxylic acids,
   which polymer has been grafted onto from 3 to 15 weight % based on the weight of the continuous phase of a rubbery polymer selected from the group consisting of:
   c) i) polymers comprising one or more $C_{4-6}$ conjugated diolefin monomers;
      ii) polymers comprising from 20 to 40 weight % of one or more monomers selected from the group consisting of acrylonitrile and methacrylonitrile and from 80 to 60 weight % of one or more $C_{4-6}$ conjugated diolefin monomers; and
      iii) polymers comprising from 40 to 60 weight % of one or more $C_{6-12}$ vinyl aromatic monomers which are unsubstituted or substituted by a $C_{1-4}$ alkyl radical and from 60 to 40 weight % of one or more $C_{4-6}$ conjugated diolefin monomers;
B) at least one layer having a thickness from 1 to 45 mils of one or more polyesters comprising from 50 to 80 weight % of one or more $C_{8-14}$ aromatic dicarboxylic acids; from 20 to 50 weight % of one or more glycols selected from the group consisting of $C_{2-10}$ alkylene glycols and $C_{6-10}$ cyclic glycols and optionally from 0 to 10 weight % of one or more $C_{3-12}$ saturated aliphatic dicarboxylic acids; and
C) intermediate said impact modified polymer and said polyester a layer having a thickness from 1 to 10 mils of a compatibilizer having a composition according to claim 1.

15. The laminate according to claim 14, wherein said polyester layer has a thickness from 1 to 15 mils.

16. A laminate according to claim 15, wherein in said compatibilizer the block copolymer is present in an amount from 8 to 15 weight % based on the total weight of the compatibilizer and comprising from 25 to 35 weight % of polystyrene and from 75 to 85 weight % of polybutadiene which has been hydrogenated to at least 90%.

17. The laminate according to claim 16, wherein in said compatibilizer said impact modified polymer is present in an amount from 25 to 75 weight % of said compatibilizer and comprises 97 to 90 weight % of polystyrene grafted on to from 3 to 10 weight % of polybutadiene.

18. The laminate according to claim 17, wherein in said compatibilizer component i) is present in an amount from 25 to 75 weight % and is polybutylene terephthalate.

19. The laminate according to claim 18, wherein in said compatibilizer component iv) is present in an amount from 5 to 30 weight % based on the weight of said compatibilizer.

20. The laminate according to claim 19, wherein said polyester layer is polybutylene terephthalate and said impact modified polymer layer is high impact polystyrene.

21. The laminate according to claim 19, wherein said polyester layer is polyethylene terephthalate and said impact modified polymer layer is high impact polystyrene.

22. The laminate according to claim 18, wherein said polyester layer is polybutylene terephthalate and said impact modified polymer layer is high impact polystyrene.

23. The laminate according to claim 18, wherein said polyester layer is polyethylene terephthalate and said impact modified polymer layer is high impact polystyrene.

24. The laminate according to claim 17, wherein in said compatibilizer component i) is present in an amount from 25 to 75 weight % and is polyethylene terephthalate.

25. The laminate according to claim 24, wherein in said compatibilizer component iv) is present in an amount from 5 to 30 weight % based on the weight of said compatibilizer.

26. The laminate according to claim 25, wherein said polyester layer is polybutylene terephthalate and said impact modified polymer layer is high impact polystyrene.

27. The laminate according to claim 25, wherein said polyester layer is polyethylene terephthalate and said impact modified polymer layer is high impact polystyrene.

28. The laminate according to claim 24, wherein said polyester layer is polybutylene terephthalate and said impact modified polymer layer is high impact polystyrene.

29. The laminate according to claim 24, wherein said polyester layer is polybutylene terephthalate and said impact modified polymer layer is high impact polystyrene.

30. A thermoformed article made from a laminate according to claim 14.

31. A two layer laminate comprising:
   A) a layer from 1 to 45 mils thick comprising at least 5 weight % of a compatibilizer according to claim 1 and up to 95 weight % of one or more polyesters comprising from 50 to 80 weight % of one or more $C_{8-14}$ aromatic dicarboxylic acids; from 20 to 50 weight % of one or more glycols selected from the group consisting of $C_{2-10}$ alkylene glycols and $C_{6-10}$ cyclic glycols and, optionally, from 0 to 10 weight % of one or more $C_{3-12}$ saturated aliphatic dicarboxylic acids and; and
   B) a layer from 1 to 45 mils thick comprising at least 5 weight % of a compatibilizer according to claim 1 and up to 95 weight % of an impact modified polymer comprising a continuous phase comprising:
      a) from 50 to 100 weight % of one or more $C_{8-12}$ vinyl aromatic monomers which are unsubstituted or substituted by a $C_{1-4}$ alkyl radical; and
      b) from 0 to 50 weight % of one or more monomers selected from the group consisting of acrylonitrile, methacrylonitrile, and $C_{1-4}$ alkyl esters of $C_{3-4}$ ethylenically unsaturated carboxylic acids;
   which polymer has been grafted onto from 3 to 15 weight % based on the weight of the continuous phase of a rubbery polymer selected from the group consisting of:
      c) i) polymers comprising one or more $C_{4-6}$ conjugated diolefin monomers;
      ii) polymers comprising from 20 to 40 weight % of one or more monomers selected from the group consisting of acrylonitrile and methacrylonitrile and from 80 to 60 weight % of one or more $C_{4-6}$ conjugated diolefin monomers; and
      iii) polymers comprising from 40 to 60 weight % of one or more $C_{6-12}$ vinyl aromatic monomers which are unsubstituted or substituted by a $C_{1-4}$ alkyl radical and from 60 to 40 weight % of one or more $C_{4-6}$ conjugated diolefin monomers.

32. The laminate according to claim 31, wherein in each layer said compatibilizer is present in an amount from 10 to 25 weight %.

33. A laminate according to claim 32, wherein in said compatibilizer the block copolymer is present in an amount from 8 to 15 weight % based on the total weight of the compatibilizer and comprising from 25 to 35 weight % of polystyrene and from 75 to 85 weight % of polybutadiene which has been hydrogenated to at least 90%.

34. The laminate according to claim 33, wherein in said compatibilizer said impact modified polymer is present in an amount from 25 to 75 weight % of said compatibilizer and comprises 97 to 90 weight % of polystyrene grafted on to from 3 to 10 weight % of polybutadiene.

35. The laminate according to claim 34, wherein in said compatibilizer component i) is present in an amount from 25 to 75 weight % and is polybutylene terephthalate.

36. The laminate according to claim 35, wherein in said compatibilizer component iv) is present in an amount from 5 to 30 weight % based on the weight of said compatibilizer.

37. The laminate according to claim 36, wherein said polyester layer is polybutylene terephthalate and said impact modified polymer layer is high impact polystyrene.

38. The laminate according to claim 36, wherein said polyester layer is polyethylene terephthalate and said impact modified polymer layer is high impact polystyrene.

39. The laminate according to claim 35, wherein said polyester layer is polybutylene terephthalate and said impact modified polymer layer is high impact polystyrene.

40. The laminate according to claim 35, wherein said polyester layer is polyethylene terephthalate and said impact modified polymer layer is high impact polystyrene.

41. The laminate according to claim 34, wherein in said compatibilizer component i) is present in an amount from 25 to 75 weight % and is polyethylene terephthalate.

42. The laminate according to claim 41, wherein in said compatibilizer component iv) is present in an amount from 5 to 30 weight % based on the weight of said compatibilizer.

43. The laminate according to claim 42, wherein said polyester layer is polybutylene terephthalate and said impact modified polymer layer is high impact polystyrene.

44. The laminate according to claim 42, wherein said polyester layer is polyethylene terephthalate and said impact modified polymer layer is high impact polystyrene.

45. The laminate according to claim 41, wherein said polyester layer is polybutylene terephthalate and said impact modified polymer layer is high impact polystyrene.

46. The laminate according to claim 41, wherein said polyester layer is polybutylene terephthalate and said impact modified polymer layer is high impact polystyrene.

47. A thermoformed article made from a laminate according to claim 31.

* * * * *

UNITED STATES PATENT AND TRADEMARK OFFICE
CERTIFICATE OF CORRECTION

PATENT NO  : 6,153,307
DATED      : November 28, 2000
INVENTOR(S): Beth Ann Baran It is certified that error appears in the above-identified patent and that said Letters Patent are hereby corrected as shown below:

Please correct the name of the inventors on the front page of the patent to read:

Beth Ann Baran of Monessen, PA;

Brent Lee Spithaler of Pittsburg, PA;

William J. Cleland III of Canfield, OH; and

Robert Roberts, Belchertown, MA.

Signed and Sealed this

Twenty-second Day of May, 2001

NICHOLAS P. GODICI

*Attest:*

*Attesting Officer*     Acting Director of the United States Patent and Trademark Office